(12) United States Patent
Fernandez et al.

(10) Patent No.: US 8,159,387 B1
(45) Date of Patent: Apr. 17, 2012

(54) MULTI-TRANSMITTER INTERFEROMETRY

(75) Inventors: Jose Fernandez, Panama City, FL (US);
Richard Rikoski, Alameda, CA (US);
John Stroud, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 222 days.

(21) Appl. No.: 12/798,170

(22) Filed: Mar. 15, 2010

(51) Int. Cl.
*G01S 13/42* (2006.01)
*G01S 3/80* (2006.01)

(52) U.S. Cl. ........ 342/146; 342/123; 342/126; 342/140; 367/127; 367/129

(58) Field of Classification Search .................. 342/146, 342/123, 125, 126, 139, 140; 367/127, 129
See application file for complete search history.

(56) References Cited

U.S. PATENT DOCUMENTS

| | | | | |
|---|---|---|---|---|
| 5,614,912 | A * | 3/1997 | Mitchell | 342/146 |
| 6,546,256 | B1 * | 4/2003 | Maloney et al. | 455/404.2 |
| 6,683,568 | B1 * | 1/2004 | James et al. | 342/387 |
| 7,417,924 | B2 * | 8/2008 | Vigen et al. | 367/129 |
| 8,022,873 | B2 * | 9/2011 | Voirin et al. | 342/442 |
| 2003/0069025 | A1 * | 4/2003 | Hoctor et al. | 455/456 |
| 2008/0186235 | A1 * | 8/2008 | Struckman et al. | 342/465 |
| 2011/0038230 | A1 * | 2/2011 | Napolitano et al. | 367/127 |

* cited by examiner

*Primary Examiner* — John B Sotomayor
(74) *Attorney, Agent, or Firm* — James T. Shepherd

(57) ABSTRACT

Systems and methods for obtaining target elevation information are disclosed. The systems and methods use multiple vertical transmitters and one or more receivers to infer changes in the elevation plane and the height of objects. Changes in elevation and heights of objects are inferred from path length differences between the transmitters and a particular backscattering point. Using known geometric information regarding the configuration of the transmitters, propagation time differences can be estimated via time delay estimation methods in either the time or frequency domain. Appropriate modulation schemes are used such that the multiple signals transmitted are separable upon reception.

15 Claims, 3 Drawing Sheets

MULTI-TRANSMITTER INTERFEROMETRY

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

Not applicable.

BACKGROUND OF THE INVENTION (1) Field of the Invention

The present invention relates to obtaining target location information, and more specifically to systems and methods for obtaining target elevation information.

(2) Description of the Prior Art

Systems and methods for estimating the heights of objects, or the changes in the elevation plane of an image, to ultimately produce three-dimensional imagery have been known in the RADAR and SONAR communities for a number of years.

Basically, the known systems and methods use differences in path lengths between signals received at two or more known vertical locations to infer elevation changes in the terrain and the height of objects. One method commonly used in the RADAR community for this type of topographic imaging is interferometry, where phase differences of the received signals are used to estimate the path length differences and ultimately infer elevation changes.

Interferometer methods or techniques are broadly categorized as either multi-pass or single-pass. Multi-pass techniques use the relative separation between multiple trajectories or passes of a platform with a single sensor to form the interferometer. Single-pass techniques use the separation of two or more receivers carried by the same platform to form the interferometer.

Multi-pass methods typically are not used in aircrafts or underwater vehicles due to the complexities and inefficiencies associated with accurately duplicating trajectories and motions between multiple passes. Even if the trajectories and motions can be duplicated, changes in environmental conditions, in the scene itself, or in a combination of the two, during the time between passes can compromise the results.

More recently, interferometer topographic mapping methods have been combined with synthetic aperture (SA) imaging methodologies to generate high-resolution three-dimensional imagery. Such systems commonly are referred to as Interferometric Synthetic Aperture Radar (InSAR) and Interferometric Synthetic Aperture Sonar (InSAS) in the RADAR and SONAR communities, respectively.

The systems and methods discussed hereinafter are presented and developed principally from an InSAS perspective. Those of skill in the art will recognize that the systems and methods disclosed herein are equally applicable to InSAR. Thus, references to InSAS systems and methods can be taken also to include InSAR systems and methods.

Current single-pass InSAS systems and methods rely on a single transmitter and a multi-element receiver array to estimate changes in the elevation plane. Referring to prior art FIG. 1, there is shown a schematic representation of such a system S. Transmitter TX and two vertical receivers, RX1 and RX2, are spaced along vertical axis Y. Transmitter TX and receivers RX1 and RX2 are taken to be single elements of length L along fore-aft axis Z (towards and away from the viewer of FIG. 1).

With knowledge of the altitude H of receiver RX1, the elevation or height h of point A can be approximated by:

$$h = H - r_1 \cos(\theta), \text{ where} \quad (1)$$

$r_1$ is the path length between point A and receiver RX1, and $\theta$ is the angle of the backscattered signals.

With knowledge of the baseline separation D between receivers RX1 and RX2 and the tilt angle $\beta$ of receivers RX1 and RX2, $\theta$ can be estimated via trigonometric manipulations with inference of the path lengths $r_1$ and $r_2$, where $r_2$ is the path length between point A and receiver RX2. As shown in FIG. 1, the angle is defined as $\psi = \pi - \beta - \theta$. Thus:

$$\theta = \pi - \psi - \beta,$$

$$\theta = \pi - \arccos\left[\frac{D^2 + r_1^2 - r_2^2}{2Dr_1}\right] - \beta, \text{ and} \quad (2)$$

$$\theta = \arccos\left[\frac{r_2^2 - D^2 - r_1^2}{2Dr_1}\right] - \beta.$$

The path lengths $r_1$ and $r_2$ are related by:

$$r_2 = r_1 + dr = r_1 + c\tau, \text{ where} \quad (3)$$

dr is the difference in path lengths $r_1$ and $r_2$,
c is the propagation speed of sound, and
$\tau$ is the time of arrival difference between the signals at receivers RX1 and RX2.

Time of arrival differences are estimated via known signal cross correlation methods in either the time or frequency domain. The performance of the chosen cross correlation method is enhanced by improving the signal-to-noise ratio as well as improving the resolution of the range and along-track position of the cell or pixel (point A) for which elevation information is being inferred.

Fine along-track resolutions from relatively small physical arrays are obtained using known SAS imaging techniques, which exploit the forward motion of the platform to synthesize a larger array aperture than that of the real or physical array aperture. Multi-element receiver or vernier array SAS systems are capable of achieving fine resolutions and increasing the area coverage rate (ACR) of the system.

Reducing the width of the elements and increasing the number of elements improve the potential resolution and ACR of the system. Unfortunately, doing so increases the total channel count and receiver hardware complexity of the SAS, a very important factor in the overall system design. Further, an InSAS based on identical, dual, vertical receivers would require as a minimum twice the number of elements, with corresponding increases in the mechanical, electrical and functional complexity of the hardware.

In autonomous underwater vehicle (AUV) systems in particular, where energy is limited, the added complexity of such a design is clearly unwanted. In such systems, it is desirable to minimize the overall power consumption, volume and weight of the AUV so as to optimize the endurance, or operational time, as a function of the available energy.

What are needed are systems and methods for obtaining target elevation information that can maintain the high resolution of multi-element receivers, while reducing the overall power consumption, volume and weight of InSAS systems having dual, vertical receivers.

SUMMARY OF THE INVENTION

It is therefore a general purpose and primary object of the present invention to provide systems and methods for obtaining target elevation information. The systems include multiple vertical transmitters and at least one receiver to infer changes in the elevation plane and the height of objects. Changes in elevation and heights of objects are inferred from path length differences between the transmitters and a particular backscattering point.

Using known geometric information regarding the configuration of the transmitters, propagation time differences can be estimated via time delay estimation methods in either the time or frequency domain. Appropriate modulation schemes are used such that the multiple signals transmitted are separable upon reception.

In one embodiment, a method for obtaining elevation information of a target includes the step of transmitting first and second signals from respective first and second transmitters. The first and second signals are backscattered from the target and obtained at a receiver and propagation time differences, $\tau$, for the backscattered signals are estimated so as to determine the relationship between the path lengths to the target, $t_1$ and $t_2$, of the first and second signals, respectively.

Using this relationship and known geometric relationships between the transmitters, the angle, $\sigma$, of the path of the first signal is determined. In turn, the elevation, e, can be obtained based on $\sigma$ and the known height, E, of the first transmitter from $e=E-t_1 \cos(\sigma)$.

The relationship between the path lengths is given by $t_2=t_1+c\sigma$, where c is the speed of propagation of the signals. Further, the angle, $\sigma$, can be determined from $$\sigma = \arccos\left[\frac{t_2^2 - F^2 - t_1^2}{2Ft_1}\right] - \varphi,$$

where F is the known baseline separation between the transmitters, and $\varphi$ is the known tilt angle of the transmitters.

In one embodiment, signal cross correlation in the time or frequency domain is used to estimate the time of propagation differences. In one embodiment, transmitting includes modulating the first and second signals to facilitate separation of the backscattered signals at the receiver.

In one embodiment, a system for determining an elevation, e, of a target above a baseline includes a first transmitter spaced a known distance, E, above the baseline and transmitting a first signal towards the target. A path, $t_1$, of the first signal forms an angle, $\sigma$, with a vertical axis passing through the first transmitter.

The system includes a second transmitter spaced a known distance, F, from the first transmitter along a line forming a known angle, $\varphi$, with the vertical axis. The second transmitter transmits a second signal towards the target along a path, $t_2$. A receiver, further spaced along the line, obtains the first and second signals after they are backscattered from the target. The elevation is determined based on $e=E-t_1 \cos(\sigma)$ and $$\sigma = \arccos\left[\frac{t_2^2 - F^2 - t_1^2}{2Ft_1}\right] - \varphi.$$

In one embodiment, the system includes a processor in communication with the first and second transmitters, which modulates the signals. In one embodiment, the receiver is a multi-element synthetic aperture sonar receiver.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DESCRIPTION OF THE INVENTION

Figure 1:
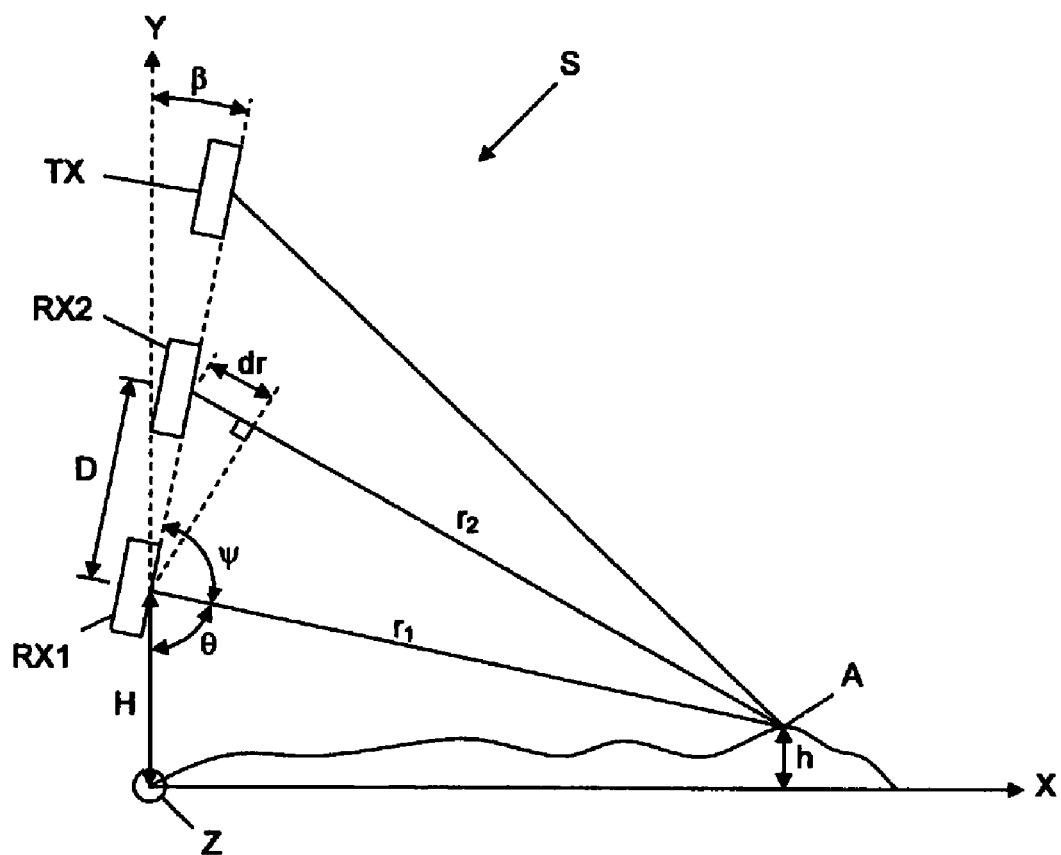
FIG. 1 illustrates a schematic representation of a prior art system for obtaining target elevation information.
Figure 2:
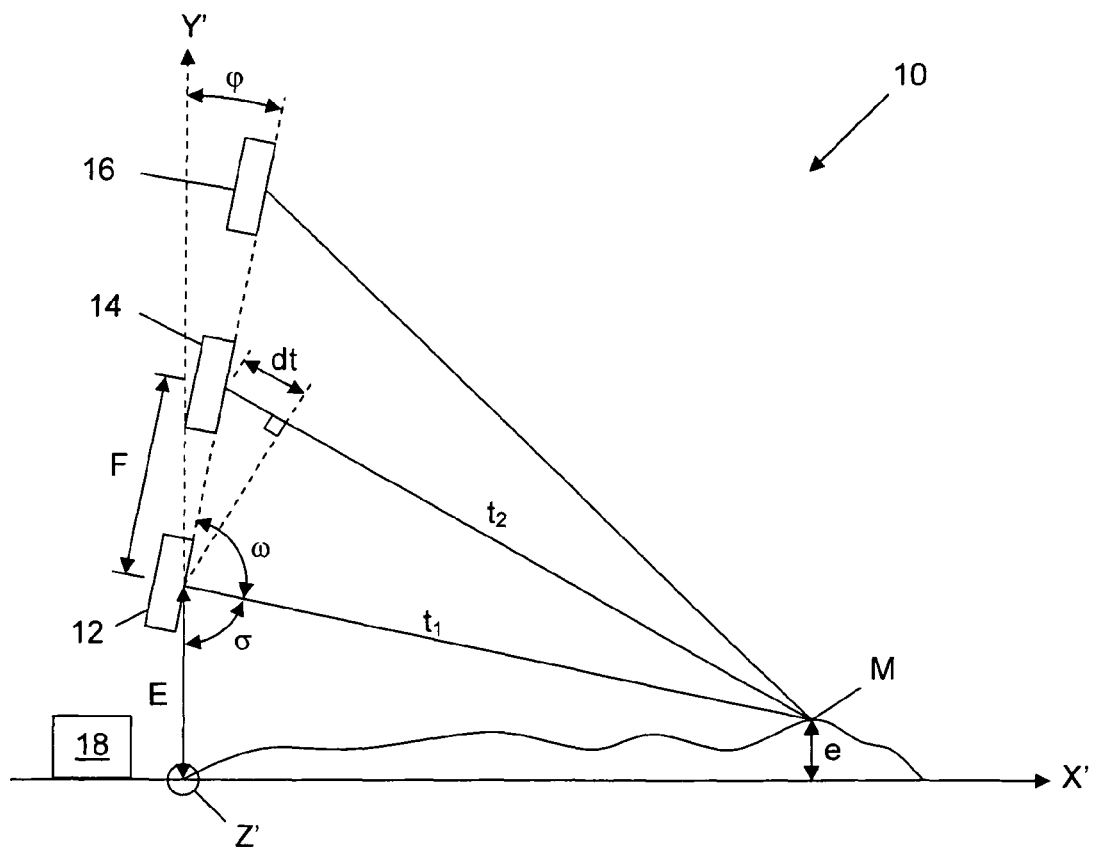
FIG. 2 illustrates a schematic representation of a two-transmitter system for obtaining target elevation information.

Referring now to FIG. 2, there is shown a schematic representation of two-transmitter system 10 for obtaining target elevation information. Transmitters 12 and 14 and vertical receiver 16 are spaced along vertical axis Y'. Transmitters 12 and 14 and receiver 16 are taken to be single elements of length L' along fore-aft axis Z' (towards and away from the viewer of FIG. 2).

With knowledge of the altitude E of transmitter 12, the elevation or height, e, of point M (the target) can be approximated by:

$$e=E-t_1 \cos(\sigma), \text{ where} \quad (4)$$

$t_1$ is the path length between point M and transmitter 12, and $\sigma$ is the angle of the signal from transmitter 12, i.e., the angle of the path, $t_1$, with respect to vertical axis Y'.

With knowledge of the baseline separation F between transmitters 12 and 14 and the tilt angle $\varphi$ of transmitters 12 and 14, $\sigma$ can be estimated via trigonometric manipulations with inference of the path lengths $t_1$ and $t_2$, where $t_2$ is the path length between point M and transmitter 14. As shown in FIG. 2, the angle $\omega$ is defined as $\omega=\pi-\varphi-\sigma$. Thus:

$\omega=\pi-\varphi-\sigma$, $$\sigma = \pi - \arccos\left[\frac{F^2 + t_1^2 - t_2^2}{2Ft_1}\right] - \varphi, \text{ and} \quad (5)$$

$$\sigma = \arccos\left[\frac{t_2^2 - F^2 - t_1^2}{2Ft_1}\right] - \varphi,$$

The path lengths $t_1$ and $t_2$ are related by:

$$t_2=t_1+dt=t_1+c\tau, \text{ where} \quad (6)$$

dt is the difference in path lengths $t_1$ and $t_2$, c is the propagation speed of sound, and $\tau$ is the time of propagation difference between the signals at transmitters 12 and 14.

Modulation schemes known to those of skill in the art can be used to ensure that the multiple signals transmitted by transmitters 12 and 14 are separable upon reception at receiver 16. In a manner similar to that used for the time of arrival differences of the prior art multi-receiver method described hereinbefore, the propagation time differences can be estimated via known signal cross correlation methods in either the time or frequency domain.

Processor 18 is in communication with and controls the operation of transmitters 12 and 14 and receiver 16. Accordingly, processor 18 applies the modulation scheme to the transmitted signals and further performs the estimations and calculations for the above determination of elevation e. The location of processor 18 along axis X' shown in FIG. 2 is for illustration purposes only and not for limitation.

The performance of the chosen cross correlation method depends on how well the altitude E and tilt angle φ can be measured, and on the accuracy of the path length difference estimates. To improve upon the estimation of the path length differences it is desirable to improve the azimuth or along-track and range resolutions and the signal-to-noise ratio (SNR). Finer along-track and range resolutions improve the ability to determine the range and along-track position of the resolution cell or pixel (point M) for which elevation information is being inferred.

As previously discussed herein, fine along-track resolutions from relatively small physical arrays are obtained via SAS imaging techniques. Basically, signals are transmitted and received at sequential platform locations during the platform's trajectory, which for simplicity will be assumed to be a straight-line trajectory traveled at a constant speed. The time histories of the signals acquired at those locations are stored and added coherently to synthesize a long aperture proportionally increasing the along-track resolution of the system.

The finest theoretical along-track resolution, α, of a SAS is L'/2, where L' is the previously defined along-track (axis Z') length of the receiver element or antenna. To avoid spatial aliasing and to maintain acceptable image quality, the separation between successive transmit/receive locations should be less than L'/2. That constraint, along with the two-way propagation time t=2R/c to a range R limits the maximum velocity, V, of the system to V=L'c/4R. In addition, the area coverage rate (ACR) of the single sided array is limited to L'c/4.

Due to the slow propagation speed of sound waves in water, multi-element receiver or vernier arrays are used in SAS systems to achieve fine resolutions and increase the ACR. After proper processing of a vernier array composed of N elements of width L', the theoretical resolution, maximum platform velocity and ACR would be L'/2, NL'c/4R and NL'c/4, respectively.

Thus, reducing the width of the elements and increasing the number of elements improves the potential resolution and ACR of the system. Unfortunately, doing so increases the total channel count and receiver hardware complexity of the SAS, a very important factor in the overall system design.

The range resolution, δ, of a SAS, as well as for other pulsed SONAR systems, is approximately c/2B, where B is the bandwidth of the signal transmitted, received and processed. Bandwidth is limited primarily by transducer technology, both transmit and receive, and less restrictively by design choices made during the sonar design process.

For continuous wave (CW) pulse transmissions, the bandwidth is inversely proportional to the length of the pulse, $T_p$, i.e., $B \propto 1/T_p$. For that type of signal, range resolution improves by reducing the pulse length. Unfortunately, reducing the pulse length has the adverse effect of decreasing the SNR.

Signal modulation techniques are used to increase the duration of the pulse over a given bandwidth. One modulation method known to those of skill in the art is the linear frequency modulated (LFM) pulse, commonly known as a "chirp". Upon reception of the modulated signal, the pulse length is compressed via a convolution operation with a time-reversed replica of the transmitted pulse.

This process is commonly referred to as match filtering, and essentially results in the autocorrelation function of the signal. The temporal width of the autocorrelation function, which is inversely proportional to the bandwidth and a function of the modulation scheme, ultimately determines the range resolution.

As an example of the foregoing, a SAS designed to produce along-track and range resolutions of 2 centimeters (cm), to a maximum range of 240 meters (m), mounted on a 2 m/sec capable platform, would require a 1.28 m vernier array (subdivided as thirty-two 4 cm wide elements), and a 37.5 kHz bandwidth. A prior art InSAS based on identical, dual, vertical receivers would require, as a minimum, twice the number of elements, and would increase the mechanical, electrical and functional complexity of the hardware.

Figure 3:
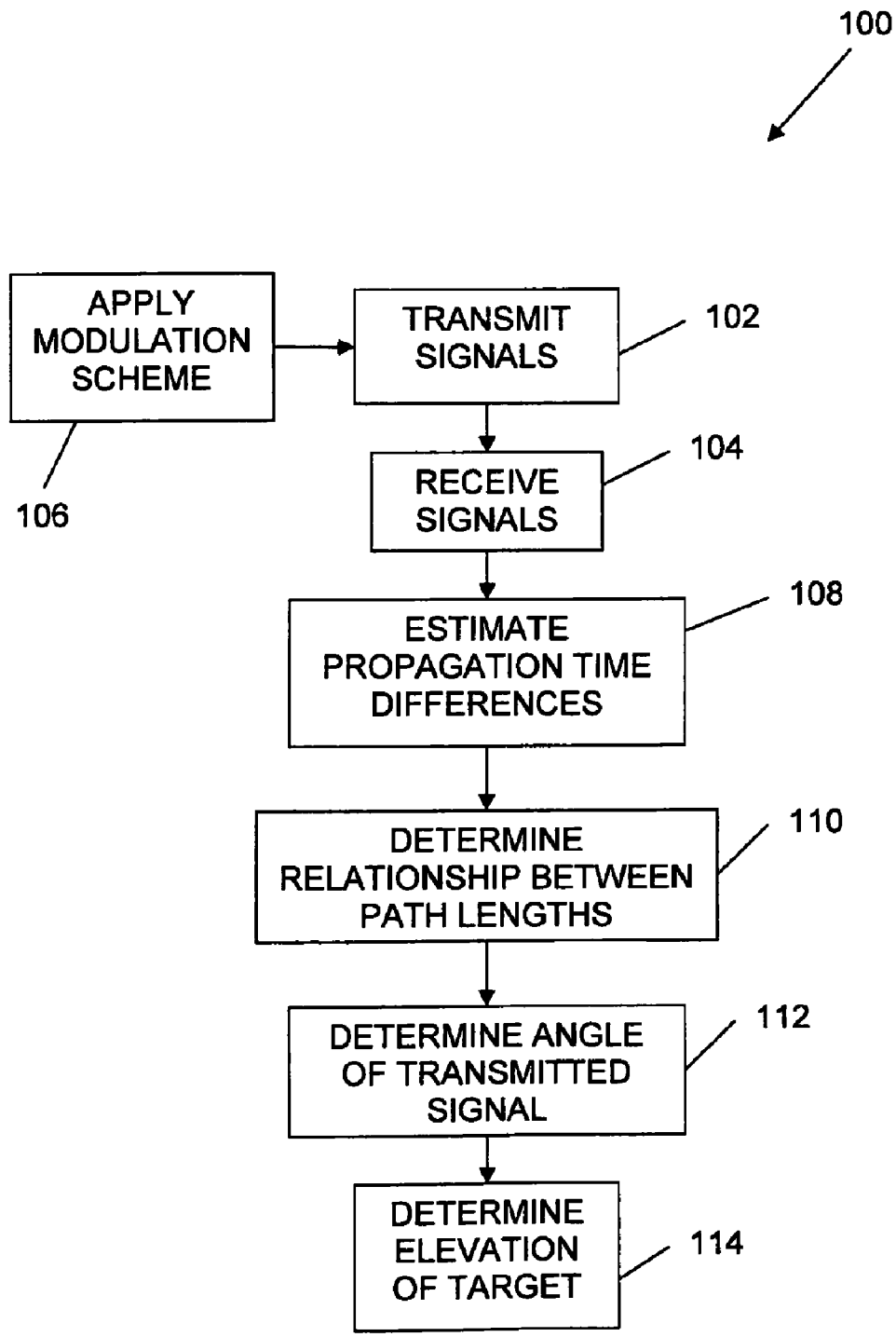
FIG. 3 is a block diagram of a method for obtaining target elevation information.

Referring also to FIG. 3, there is shown a block diagram of method 100 for obtaining target elevation information. In the following discussion, reference letters and reference numerals below 100 refer to features illustrated in FIG. 2.

At block 102, transmitters 12 and 14 transmit signals to the target (point M). The backscattered signals are obtained by receiver 16 at block 104. Block 106 indicates that modulation schemes are used such that the multiple signals transmitted are separable upon reception.

Propagation time differences are estimated at block 108 to determine the relationship between the path lengths $t_1$ and $t_2$ from Equation (6) at block 110. As has been described previously, propagation time differences can be estimated via known signal cross correlation methods in either the time or frequency domain. Block 112 determines the angle, σ, of the path of $t_1$ with respect to vertical axis Y' from Equation (5). The elevation, e, of point M is then determined from Equation (4) at block 114.

What have thus been described are systems and methods for obtaining target elevation information using multiple vertical transmitters and one or more receivers. Changes in elevation and heights of objects are inferred from path length differences between the transmitters and a particular backscattering point. Using known geometric information regarding the configuration of the transmitters, propagation time differences can be estimated via time delay estimation methods in either the time or frequency domain. Appropriate modulation schemes are used such that the multiple signals transmitted are separable upon reception.

At the expense of an extra transmitter, the systems and methods described herein provide the potential to reduce the mechanical, electrical and functional complexity of a comparable resolution multi-vertical receiver based InSAS. For the example referenced hereinbefore, the number of receiving elements and associated electronics are reduced by a count of 64 total channels (32 channels per side) when both port and starboard SONAR sides are considered.

Such a dramatic reduction in channels decreases the volume and weight requirements of the receiver assembly, reduces the complexity of the fabrication process and significantly reduces costs. Additionally, a proportional reduction in electrical and data rate requirements can be realized.

Obviously many modifications and variations of the present invention may become apparent in light of the above teachings. For example, the systems and methods described with respect to SONAR are equally applicable to RADAR systems and methods. Additionally, the systems and methods described herein are not limited to SAS and SAR systems. While SAS and SAR systems provide clear examples of reductions in complexity and costs, the multiple transmitter and single receiver configuration of the systems and methods described herein are applicable to single element receivers as well.

Further, the number of transmitters is not limited to two. However, increasing the number of transmitters beyond two results in diminishing the advantages associated with the systems and methods as described. Systems having multiple receivers also can be considered, with the methods described herein being applied to any grouping of two or more transmitters and one receiver. However, in the case of multiple receivers, the dramatic reductions in complexity and costs are not realized. Still further, the systems and methods described herein are not constrained by the modulation scheme used for separation of the multiple signals transmitted, nor by the signal cross correlation methods used to estimate the propagation time differences.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A method for obtaining elevation information of a target, said method comprising the steps of:
    transmitting a first signal from a first transmitter;
    transmitting a second signal from a second transmitter;
    obtaining, at a receiver, said first and second signals backscattered from said target;
    estimating a propagation time difference, T, for said backscattered signals;
    determining a relationship between path lengths of said first and second signals to said target based on said propagation time differences;
    determining an angle, σ, of said first signal based on said relationship between said path lengths and known geometric relationships between said first and second transmitters; and
    determining elevation information, e, based on said angle and a known height of said first transmitter.

2. A method according to claim 1, wherein said step of estimating comprises signal cross correlation in at least one of a time and frequency domain.

3. A method according to claim 1, wherein said relationship is given by $t_2 = t_1 + c\tau$, where:
    $t_2$ is a path length between said second transmitter and said target;
    $t_1$ is a path length between said first transmitter and said target; and
    c is a speed of propagation of said signals.

4. A method according to claim 1, wherein said angle is determined from $$\sigma = \arccos\left[\frac{t_2^2 - F^2 - t_1^2}{2Ft_1}\right] - \varphi,$$

where:
    $t_2$ is a path length between said second transmitter and said target;
    F is a baseline separation between said transmitters;
    $t_1$ is a path length between said first transmitter and said target; and
    φ is a tilt angle of said transmitters.

5. A method according to claim 1, wherein said elevation information is determined from $e = E - t_1 \cos(\sigma)$, where:
    E is an elevation of said first transmitter; and
    $t_1$ is a path length between said first transmitter and said target.

6. A method according to claim 1, wherein said steps of transmitting further comprise modulating said first and second signals to facilitate separation of said signals at said receiver.

7. A method according to claim 6, wherein said step of estimating comprises signal cross correlation in at least one of a time and frequency domain.

8. A method according to claim 6, wherein said relationship is given by $t_2 = t_1 + c\tau$, where:
    $t_2$ is a path length between said second transmitter and said target;
    $t_1$ is a path length between said first transmitter and said target; and
    c is a speed of propagation of said signals.

9. A method according to claim 8, wherein said angle is determined from $$\sigma = \arccos\left[\frac{t_2^2 - F^2 - t_1^2}{2Ft_1}\right] - \varphi,$$

where:
    F is a baseline separation between said transmitters; and
    φ is a tilt angle of said transmitters.

10. A method according to claim 9, wherein said elevation information is determined from $e = E - t_1 \cos(\sigma)$, where E is an elevation of said first transmitter.

11. A method according to claim 10, wherein said step of estimating comprises signal cross correlation in at least one of a time and frequency domain.

12. A system for determining an elevation, e, of a target above a baseline, comprising:
    a first transmitter spaced a known distance, E, above the baseline and transmitting a first signal towards said target, a path, $t_1$, of said first signal forming an angle, σ, with a vertical axis through said first transmitter;
    a second transmitter spaced a known distance, F, from said first transmitter along a line forming a known angle, φ, with the vertical axis, said second transmitter transmitting a second signal towards said target along a path, $t_2$;
    a receiver further spaced along said line, said first and second signals being backscattered from said target and being obtained by said receiver, said elevation being determined based on $$\sigma = \arccos\left[\frac{t_2^2 - F^2 - t_1^2}{2Ft_1}\right] - \varphi$$

and $e = E - t_1 \cos(\sigma).$

13. A system according to claim 12, further comprising a processor in communication with said first and second transmitters, said processor modulating said first and second signals.

14. A system according to claim 12, wherein said receiver comprises a multi-element synthetic aperture sonar receiver.

15. A system according to claim 14, further comprising a processor in communication with said first and second transmitters, said processor modulating said first and second signals.

* * * * *